United States Patent
Chada et al.

(10) Patent No.: US 9,935,682 B1
(45) Date of Patent: Apr. 3, 2018

(54) SYSTEM AND METHOD FOR PAM-4 TRANSMITTER BIT EQUALIZATION FOR IMPROVED CHANNEL PERFORMANCE

(71) Applicant: DELL PRODUCTS, LP, Round Rock, TX (US)

(72) Inventors: Arun R. Chada, Round Rock, TX (US); Bhyrav M. Mutnury, Round Rock, TX (US); Jiayi He, Round Rock, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 0 days.

(21) Appl. No.: 15/388,634

(22) Filed: Dec. 22, 2016

(51) Int. Cl.
  *H04B 3/04* (2006.01)
  *H04B 14/02* (2006.01)
  *H04L 25/03* (2006.01)

(52) U.S. Cl.
  CPC ............ *H04B 3/04* (2013.01); *H04B 14/023* (2013.01); *H04L 25/03121* (2013.01); *H04L 25/03878* (2013.01)

(58) Field of Classification Search
  CPC ......... H04L 25/03878; H04L 25/03885; H04L 25/03; H04L 25/03121; H04L 25/03025; H04L 25/03114; H04L 25/03019; H04L 25/03343; H04L 25/4917; H04L 25/4919; H04B 1/04; H04B 3/04; H04B 14/023; H03K 7/02
  USPC .......................... 375/257, 286, 288, 296, 353
  See application file for complete search history.

(56) References Cited

U.S. PATENT DOCUMENTS

| | | | |
|---|---|---|---|
| 9,148,198 B1 | 9/2015 | Zhang et al. | |
| 2003/0235253 A1* | 12/2003 | Dally | H04L 25/03343 375/259 |
| 2005/0089126 A1 | 4/2005 | Zerbe et al. | |
| 2008/0310492 A1* | 12/2008 | Kasai | H04B 3/04 375/232 |
| 2009/0262797 A1* | 10/2009 | Gorecki | H04L 25/03038 375/232 |
| 2014/0153620 A1* | 6/2014 | Longo | H04L 25/4917 375/219 |
| 2015/0085914 A1 | 3/2015 | Kizer et al. | |

(Continued)

OTHER PUBLICATIONS

"An Adaptive PAM-4 5-Gb/s Backplane Transceiver in 0.25-_m CMOS," John T. Stonick, IEEE Journal of Solid-State Circuits, vol. 38, No. 3, Mar. 2003; pp. 436-443.

(Continued)

*Primary Examiner* — Betsy Deppe
(74) *Attorney, Agent, or Firm* — Larson Newman, LLP

(57) ABSTRACT

A serial data channel includes a transmitter that encodes data using a PAM-4 where each symbol is represented by one of four signal levels comprising two balanced pairs of differential signal levels, and a de-emphasis circuit. The circuit determines that a symbol represents as a first instance of a first signal state, determines that a next symbol represents a second instance of the first state, and determines that a third symbol is represented as a second state. The circuit determines that the second state is of a same balanced pair as the first state and, in response, provides a de-emphasis to the second symbol. The circuit determines that the second state is of a different balanced pair as the first state and, in response, provides the de-emphasis and a correction factor to the second symbol.

20 Claims, 5 Drawing Sheets

(56) References Cited

U.S. PATENT DOCUMENTS

2015/0256363 A1   9/2015   Shvydun et al.
2016/0149730 A1   5/2016   Navid

OTHER PUBLICATIONS

U.S. Appl. No. 15/274,579, filed Sep. 23, 2016.

* cited by examiner

SYSTEM AND METHOD FOR PAM-4 TRANSMITTER BIT EQUALIZATION FOR IMPROVED CHANNEL PERFORMANCE

FIELD OF THE DISCLOSURE

This disclosure generally relates to information handling systems, and more particularly relates to PAM-4 transmitter bit equalization for improved channel performance in a high speed serial interface.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

SUMMARY

As the performance of high speed serial interfaces increases, multi-level signaling schemes such as quaternary pulse amplitude modulation (PAM-4) signaling will be increasingly common. However, a high speed serial interface that utilizes PAM-4 signaling may present greater signal integrity challenges than would be the case for two-level signaling.

A serial data channel may include a transmitter that encodes data using a PAM-4 where each symbol is represented by one of four signal levels having two balanced pairs of differential signal levels. The serial data channel may also include a de-emphasis circuit. The de-emphasis circuit may determine that a symbol represents a first instance of a first signal state, that a next symbol represents a second instance of the first state, and that a third symbol is represented as a second state. The de-emphasis circuit may further determine that the second state is of a same balanced pair as the first state, and in response provide a de-emphasis to the second symbol. The de-emphasis circuit may also determine that the second state is of a different balanced pair as the first state, and in response provide the de-emphasis and a correction factor to the second symbol.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
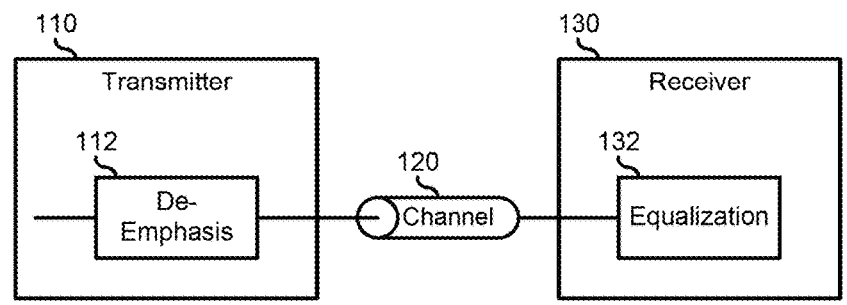
FIG. 1 is a block diagram illustrating a high speed serial channel according to an embodiment of the present disclosure.

FIG. 1 illustrates an embodiment of a high speed serial system 100 of an information handling system. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Serial system 100 includes a transmitter (TX) 110, a transmission channel 120, and a receiver (RX) 130. Serial system 100 represents one half of a bi-directional serial data link for communicating data from transmitter 110 located at a first component to receiver 130 located at a second component. The other half of the bi-directional serial data link is similar to serial system 100, but with a receiver in the first component, and a transmitter in the second component, for communicating data back from the second component to the first component. Here, the components can be understood to include elements within an information handling system, such as components that are attached to one or more printed circuit board of the information handling system, where transmission channel 120 can represent one or more circuit traces on the printed circuit board, and can include one or more connectors. The components can also be understood to include devices of an information handling system, such as a hard drive, a storage array, and the like, that are separate from the printed circuit board of the information handling system, where transmission channel 120 can include one or more transmission cables. An example of serial system 100 may include a PCI-Express (PCIe) channel that is in compliance with an advanced PCIe specification, up to, and beyond the PCIe 9.0 Specification, a Serial ATA (SATA) channel that is in compliance with one or more SATA specification, up to, and beyond the SATA 3.2 Specification, an Ethernet channel including a 1000BASE-T channel, or beyond, or another high speed serial channel.

Serial system 100 operates to provide back channel adaptation where transmitter 110 and receiver 130 communicate with each other to optimize and adjust various compensation values within the transmitter and the receiver to compensate for the insertion loss and cross-talk on transmission channel 120. A determination is made as to whether or not a set of compensation values is satisfactory based upon a determination of the bit error rate (BER) associated with the set of values. It is possible for multiple different sets of compensation values to result in acceptable BER in serial system 100. Thus, when a particular set of compensation values is obtained through the back channel adaptation, serial system 100 further operates to adjust the particular set of compensation values to lower the settings of compensation mechanisms that are known to consume a greater amount of power, and to adjust other mechanisms to correct for the lowered settings, thereby reducing the power consumption of serial system 100, while maintaining an acceptable BER.

Transmitter 110 includes de-emphasis hardware 112. In operation, serial data is provided to de-emphasis hardware 112, and the de-emphasis hardware operates to provide a reduction in the signal levels of the serial data after a first data bit is transmitted, in order to de-emphasize the subsequent data bits and to transmit the de-emphasized serial data to receiver 130 via transmission channel 120. The amount of de-emphasis is determined based upon a de-emphasis setting. For example, transmitter 110 can support 21 de-emphasis settings which each prescribe a different amount of de-emphasis, from 0 dB to 10 dB, in 0.5 dB steps. Other numbers of settings and amounts of de-emphasis prescribed by the de-emphasis setting can be utilized, as needed or desired. The de-emphasis provided by de-emphasis hardware 112 operates to reduce the signal level of subsequent bits in a bit stream after a state transition in the signal, in order to de-emphasize the low frequency content of the serial data signal, thereby compensating for losses over transmission channel 120 which may be greater for the higher frequency content in the serial data signal, thereby providing a better equalized serial data signal at receiver 130.

Receiver 130 includes equalization hardware 132. In operation, the de-emphasized serial data is received by equalization module 132, and the equalization module provides compensation to the received signal in order to open the signal eye of the received signal. The compensation can include continuous time linear equalization (CTLE) to improve inter-signal interference (ISI), automatic gain control (AGC) to provide linear gain, decision feedback equalization (DFE), or other compensation in order to open the signal eye of the received signal, as needed or desired. The amount of compensation is determined based upon an various equalization settings. For example, receiver 130 can support 21 equalization settings which each prescribe a different amount of equalization, from 0 dB to 10 dB, in 0.5 dB steps. Other numbers of settings and amounts of equalization prescribed by the equalization setting can be utilized, as needed or desired.

Serial system 100 operates based upon different communication speed settings that are each characterized by a different data rate. For example, where serial system 100 represents a PCIe serial link, serial link may be operable at 250 mega-bytes per second (MB/s), 500 MB/s, 1 giga-bytes per second (GB/s), or 2 GB/s or faster. Further, each communication speed setting is associated with a particular line encoding scheme. For example, different communication speed settings can provide for different encodings of the received serial data on the serial channel, such as an 8-bit-10-bit encoding where eight (8) bits of serial data are encoded as ten (10) bits transmitted on transmission channel 120, or a 128-bit-130-bit encoding where 128 bits of serial data are encoded as 130 bits transmitted on the transmission channel. Such encodings operate to ensure clock synchronization between transmitter 110 and receiver 130.

Figure 2:
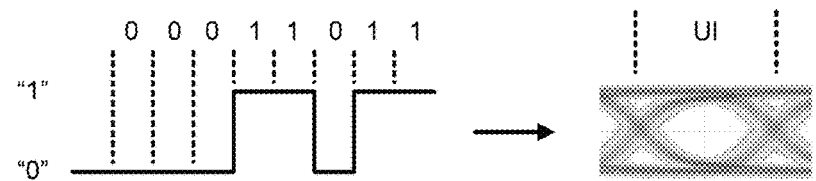
FIG. 2 illustrates signal level encoding schemes that can be implemented on the high speed serial channel of FIG. 1.
Figure 2:
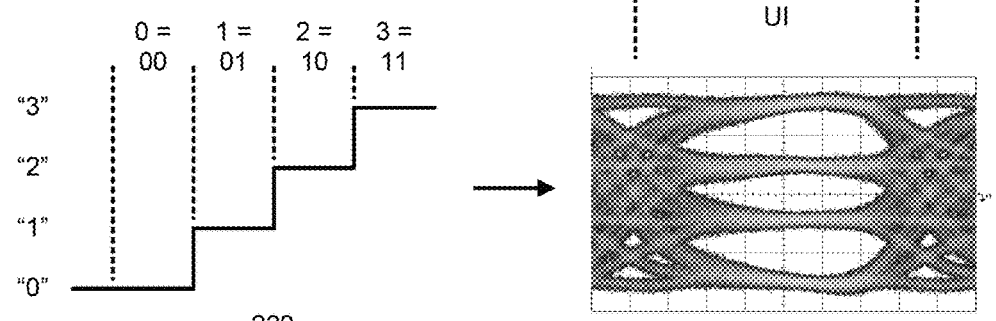

Each communication speed setting is further associated with a particular signal level encoding scheme, as shown in FIG. 2. In a first signal level encoding scheme 210, a binary (or two-level) non-return-to-zero (NRZ) encoding, the data signal transmitted on transmission channel 120 can have one of two different signal levels. Here, a digital "0" is encoded as a low state of the transmitted signal, and a digital "1" is encoded as a high state of the signal. A bit stream 212 as transmitted in binary-NRZ encoding illustrates the signal levels for the stream of serial data "0, 0, 0, 1, 1, 0, 1, 1." Eye diagram 214 is typical of a data signal transmitted using binary-NRZ encoding. In another encoding scheme 220, a quaternary (or four-level) pulse amplitude modulation (PAM-4) encoding, the data signal transmitted on transmission channel 120 can have one of four different signal levels that each encode a particular 2-bit symbol. Here, the 2-bit sequence "00" is encoded as a low level, state "0," of the transmitted signal, the 2-bit sequence "01" is encoded as a first higher level, state "1," of the transmitted signal, the 2-bit sequence "10" is encoded as a next higher level, state "3," of the transmitted signal, and the 2-bit sequence "11" is encoded as a highest level, state "4," of the transmitted signal. A bit stream 222 as transmitted in PAM-4 encoding illustrates the signal levels "0, 1, 2, 3," for data stream 212, that is, the stream of serial data "0, 0, 0, 1, 1, 0, 1, 1." Eye diagram 224 is typical of a data signal transmitted using PAM-4 encoding. Note that where a particular signal level encoding scheme utilizes PAM-4 encoding, the clock rate of serial system 100 may be half the clock rate of the a binary NRZ scheme and can still transmit the same amount of data because two bits of data are transmitted with each clock pulse. As such, PAM-4 encoding that operates at the same clock rate as a binary NRZ scheme has the potential to transmit twice the data as the binary NRZ scheme. Thus PAM-4 encoding is particularly suitable to higher bandwidth data transmission standards. Note that the 2-bit sequence encoding described above represents a particular embodiment, and that other mappings of the various 2-bit sequences onto the state levels of the PAM-4 encoding may be utilized as needed or desired.

Figure 3:
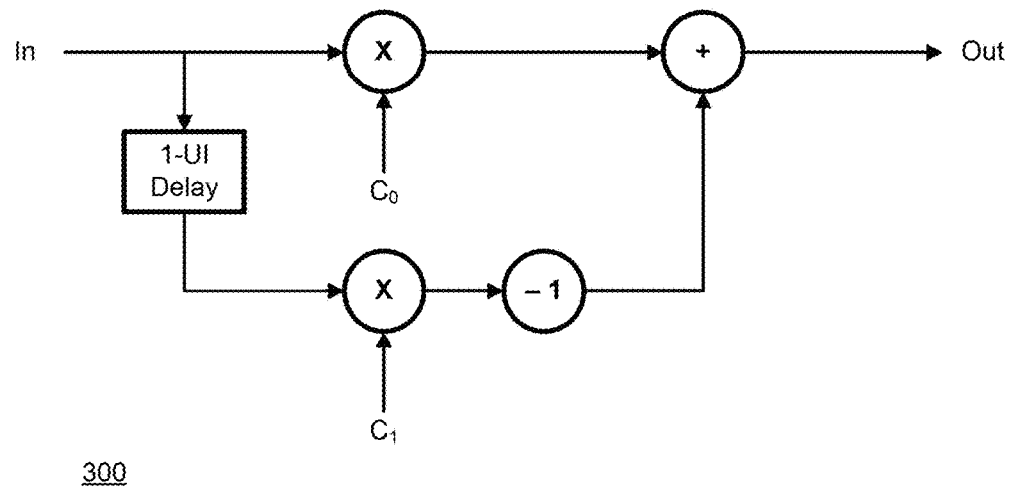
FIG. 3 is a block diagram of a transfer function for a quaternary pulse amplitude modulation (PAM-4) scheme on the high speed serial channel of FIG. 1 according to an embodiment of the present disclosure.

FIG. 3 illustrates a transfer function 300 for de-emphasis hardware 112 in transmitter 110 that provides de-emphasis for PAM-4 encoding schemes. In particular, transfer function 300 implements a two-tap feed forward equalization (FFE) scheme where de-emphasis is provided on each subsequent symbols after a first symbol is transmitted. Here, a serial data stream is inputted to transfer function 300 as a stream of data symbols. In a first clock pulse, denoted as a first unit interval (UI), a first order compensation level, $C_0$, is provided to a first data symbol, and the first data symbol is also provided to a delay unit that delays further operations on the first data symbol by 1– UI. In a second clock pulse, the first order compensation level, $C_0$, is provided to a second data symbol and a second order compensation level, $C_1$, is provided to the delayed first data symbol. The compensated delayed first data symbol is added to the compensated second data symbol to provide an output from transfer function 300. In general, the output of transfer function 300 is given as:

$$\text{Out}=C_0(\text{In}_0)-C_1(\text{In}_1) \quad \text{Equation 1;}$$

where $\text{In}_0$ is the current input state, and $\text{In}_1$ is the previous input state. In a particular embodiment, $C_0$ and $C_1$ are provided such that:

$$C_0-C_1=1 \quad \text{Equation 2.}$$

In a particular embodiment, transmitter 110 supports 21 de-emphasis, C1, settings which each prescribe a different amount of de-emphasis, from 0 dB to 10 dB, in 0.5 dB steps. Other numbers of settings and amounts of de-emphasis prescribed by the de-emphasis setting can be utilized, as needed or desired. Moreover, as illustrated, transfer function 300 illustrates a two-tap FFE scheme, but this is not necessarily so, and the de-emphasis provided can include three or more tap FFE schemes, as needed or desired.

Figure 4:
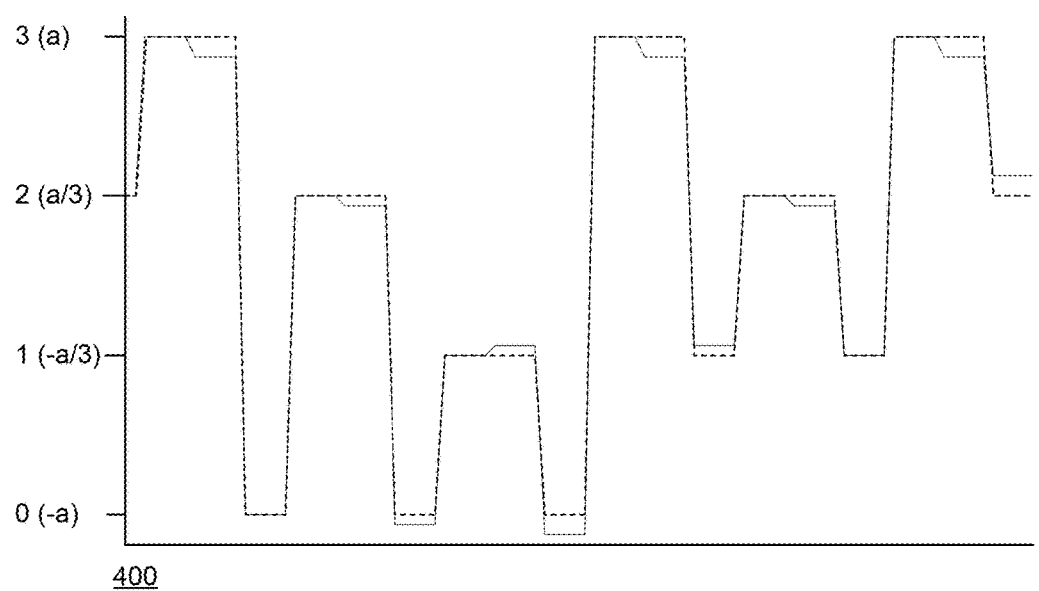
FIG. 4 is a state change diagram for the PAM-4 scheme of FIG. 3.

FIG. 4 illustrates a state change diagram for transfer function 300. Here, the serial data signal for each subsequent data symbol that has a same logical value as a first data symbol that represents a state change from a previous data symbol, is de-emphasized. The input signal stream is illustrated by the dashed line, while the de-emphasized signal is illustrated by the solid line. Where a first data symbol is a "3" having a signal level at the "3" state signal level, then subsequent "3" state symbols will be provided at a reduced "3" state signal level, where a first data symbol is a "2" having a signal level at the "2" state signal level, then subsequent "2" state symbols will be provided at a reduced "2" state signal level, where a first data symbol is a "1" having a signal level at the "1" state signal level, then subsequent "1" state symbols will be provided at an increased "1" state signal level, and where a first data symbol is a "0" having a signal level at the "0" state signal level, then subsequent "0" state symbols will be provided at an increased "0" state signal level.

Following the de-emphasis of a particular signal level, the new signal states for the falling signal transitions will be given as:

$$\text{"3"}\to\text{"0"}: C_0(-a)+C_1(a)=-a \quad \text{Equation 3;}$$

$$\text{"2"}\to\text{"0"}: C_0(-a)+C_1(a/3)=-a-C_1(2a/3) \quad \text{Equation 4;}$$

$$\text{"1"}\to\text{"0"}: C_0(-a)+C_1(-a/3)=-a-C_1(4a/3) \quad \text{Equation 5;}$$

$$\text{"3"}\to\text{"1"}: C_0(-a/3)+C_1(a)=-a/3+C_1(2a/3) \quad \text{Equation 6;}$$

$$\text{"2"}\to\text{"1"}: C_0(-a/3)+C_1(a/3)=-a/3 \quad \text{Equation 7;}$$

$$\text{"3"}\to\text{"2"}: C_0(a/3)+C_1(a)=a/3+C_1(4a/3) \quad \text{Equation 8;}$$

where each equation is simplified in the light of Equation 2, and where "a" and "–a" represent the voltage levels of the "3" state and the "0" state, respectively, assuming that the signaling is provided as a balanced differential signal. As such, "a/3" and "–a/3" represent the voltage levels of the "2" state and "1" state, respectively. The skilled artisan will recognize that similar signal level equations can be derived for the rising signal transitions. Thus, in the compensation scheme provided by transfer function 300, only the balanced transitions, that is, the transitions from signal level "a" to signal level "–a," the transitions from signal level "a/3" to signal level "–a/3," and vice versa, are provided such that the new signal states hit the target signal levels associated with the target states. In all other transitions, the actual signal level is off of the target signal level by an error factor of:

$$\Delta V_1 = \pm C1(2a/3) \quad \text{Equation 9;}$$

or $$\Delta V_2 = \pm C1(4a/3) \quad \text{Equation 10.}$$

Note that as shown in FIG. 4, the magnitude of $\Delta V$ is exaggerated for the purposes of illustration.

Figure 5:
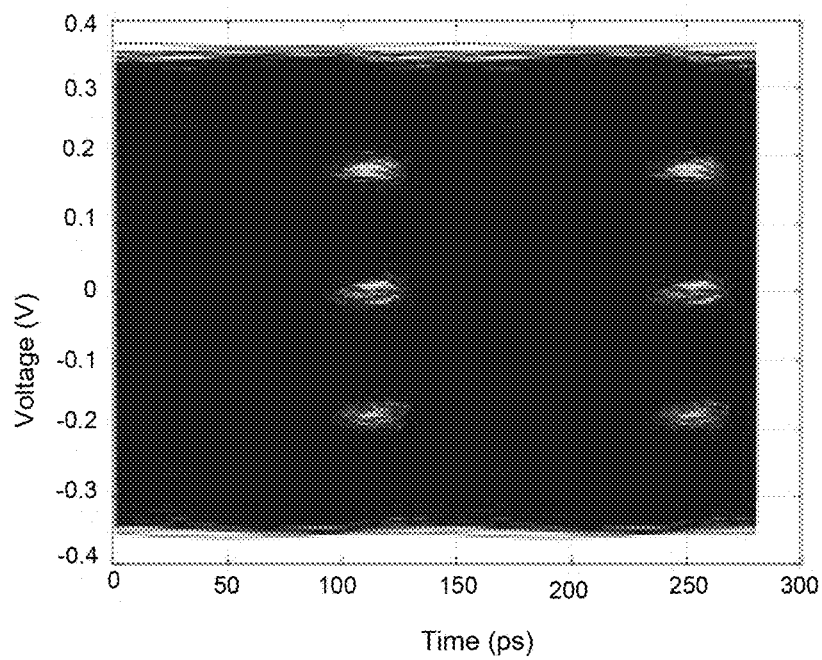
FIG. 5 is an eye diagram for the PAM-4 scheme of FIG. 3.

FIG. 5 shows an eye diagram 500 based upon modeled data associated with transfer function 300 and state change diagram 400. In particular, eye diagram 500 is based upon a 30 Gb/s transfer rate. Note that at such a transfer rate, the eye opening associated with transfer function 300 is nearly closed, and would result in an unacceptable BER.

Figure 6:
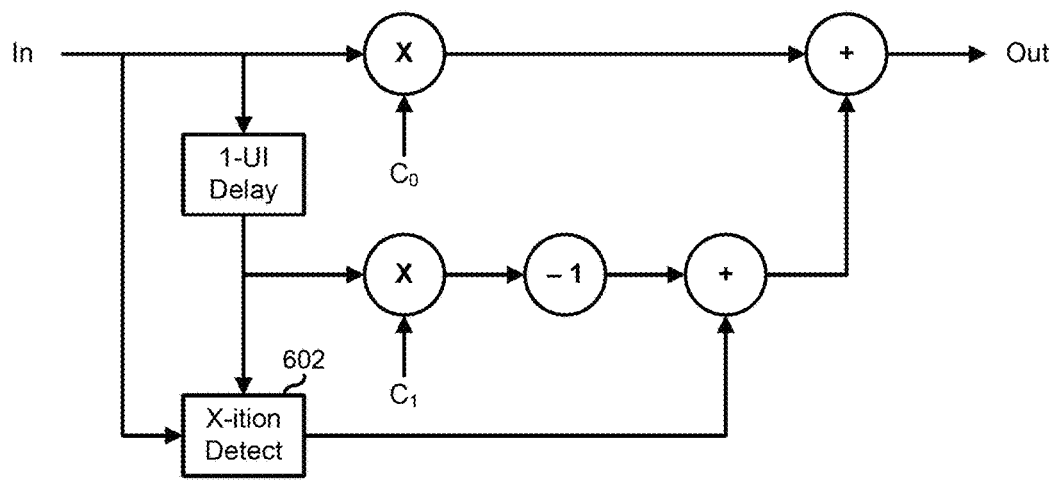
FIG. 6 is a block diagram of a transfer function for a PAM-4 scheme on the high speed serial channel of FIG. 1 according to another embodiment of the present disclosure.

FIG. 6 illustrates a transfer function 600 for de-emphasis hardware in transmitter 110 that provides a different de-emphasis scheme for PAM-4 encodings. Transfer function 600 operates similarly to transfer function 300 to implement a feed forward equalization (FFE) scheme where de-emphasis is provided on each subsequent symbols after a first symbol is transmitted. However, here, transfer function 600 includes a transition detector 602 in the second order compensation stream that adds a selectable correction factor to counter the effect of the error factor that occurs when the transition is unbalanced, such as decreasing signal levels from level "3" to levels "2" or "1" or from levels "2" or "1" to level "0," or such as the opposite signal level increases. For example, when transition detector 602 detects a transition from level "2" to level "0," as illustrated in Equation 4, above, then the transition detector can add a correction factor of "$C_1$ (2a/3)" to the output, such that, when the transition is complete, the output signal is equal to "–a," as desired. Other compensation factors of "–2a/3" and "±4a/3" can be provided by transition detector 602 as needed to obtain the other desired output levels. In a particular embodiment, the correction factors provided by transition detector 602 for the decreasing transitions are shown in Table 1, below.

TABLE 1

Correction factors for decreasing signal transitions

| Transition | Correction |
|---|---|
| 3 → 0 | 0 |
| 2 → 0 | $C_1$ (2a/3) |
| 1 → 0 | $C_1$ (4a/3) |
| 3 → 1 | $-C_1$ (2a/3) |
| 2 → 1 | 0 |
| 3 → 2 | $-C_1$ (4a/3) |

Figure 7:
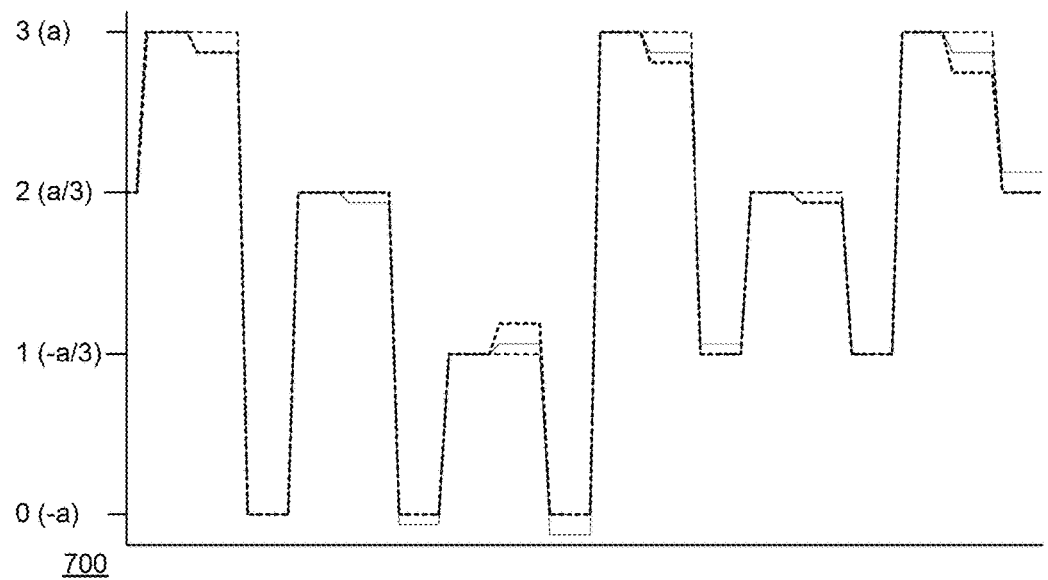
FIG. 7 is a state change diagram for the PAM-4 scheme of FIG. 6.

FIG. 7 illustrates a state change diagram for transfer function 600. The input signal stream is illustrated by the dashed line, the de-emphasized signal as provided by transfer function 300 is illustrated by the thin solid line, and the de-emphasized signal as provided by transfer function 600 is illustrated by the thick dashed line. Following the de-emphasis of a particular signal level, the new signal states for the falling signal transitions will be given as:

"3"→"0": $C_0(-a)+C_1(a)+0=-a$    Equation 11;

"2"→"0": $C_0(-a)+C_1(a/3)+C_1(2a/3)=-a$    Equation 12;

"1"→"0": $C_0(-a)+C_1(-a/3)+C_1(4a/3)=-a$    Equation 13;

"3"→"1": $C_0(-a/3)+C_1(a)-C_1(2a/3)=-a/3$    Equation 14;

"2"→"1": $C_0(-a/3)+C_1(a/3)+0=-a/3$    Equation 15;

"3"→"2": $C_0(a/3)+C_1(a)-C_1(4a/3)=a/3$    Equation 16.

The skilled artisan will recognize that similar signal level equations can be derived for the rising signal transitions. Thus, in the compensation scheme provided by transfer function 600, all of the transitions are provided such that the new signal states hit the target signal levels associated with the target states.

Figure 8:
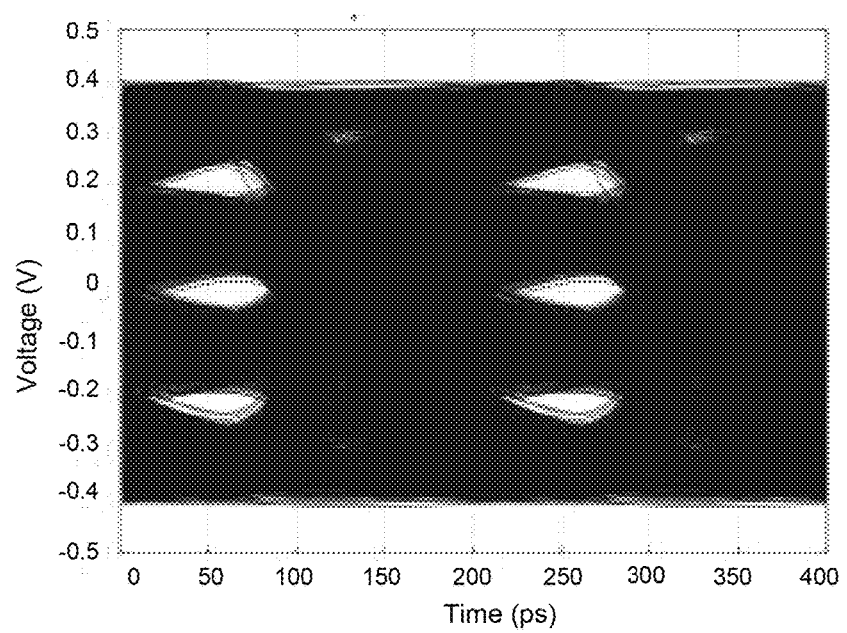
FIG. 8 is an eye diagram for the PAM-4 scheme of FIG. 6.

FIG. 8 shows an eye diagram 800 based upon modeled data associated with transfer function 600 and state change diagram 700. As with eye diagram 500, eye diagram 800 is based upon a 30 Gb/s transfer rate. Note that at such a transfer rate, the eye opening associated with transfer function 300 is much more well defined, and would result in an acceptable BER.

In the illustrated embodiment of transfer function 600, the correction factors are applied such that the error factors induced by the implementation of transfer function 300 are completely corrected, but this is not necessarily so. In a particular embodiment, other correction factors are applied that do not completely correct for the error factors induced by the transfer function, as needed or desired. For example, a constant value, such as C1 (a/3), may be added or subtracted to the signal in the second order signal stream. In this case, a small overshoot or undershoot may be induced in the balanced transitions by the addition or subtraction of the constant value, and yet, the addition or subtraction of the constant value may operate to provide an overall benefit to the resulting signal eye as seen at the receiver. In particular, where a channel is considered to be particularly lossy, the inclusion of a constant value correction factor may result in an improved BER at the receiver.

Figure 9:
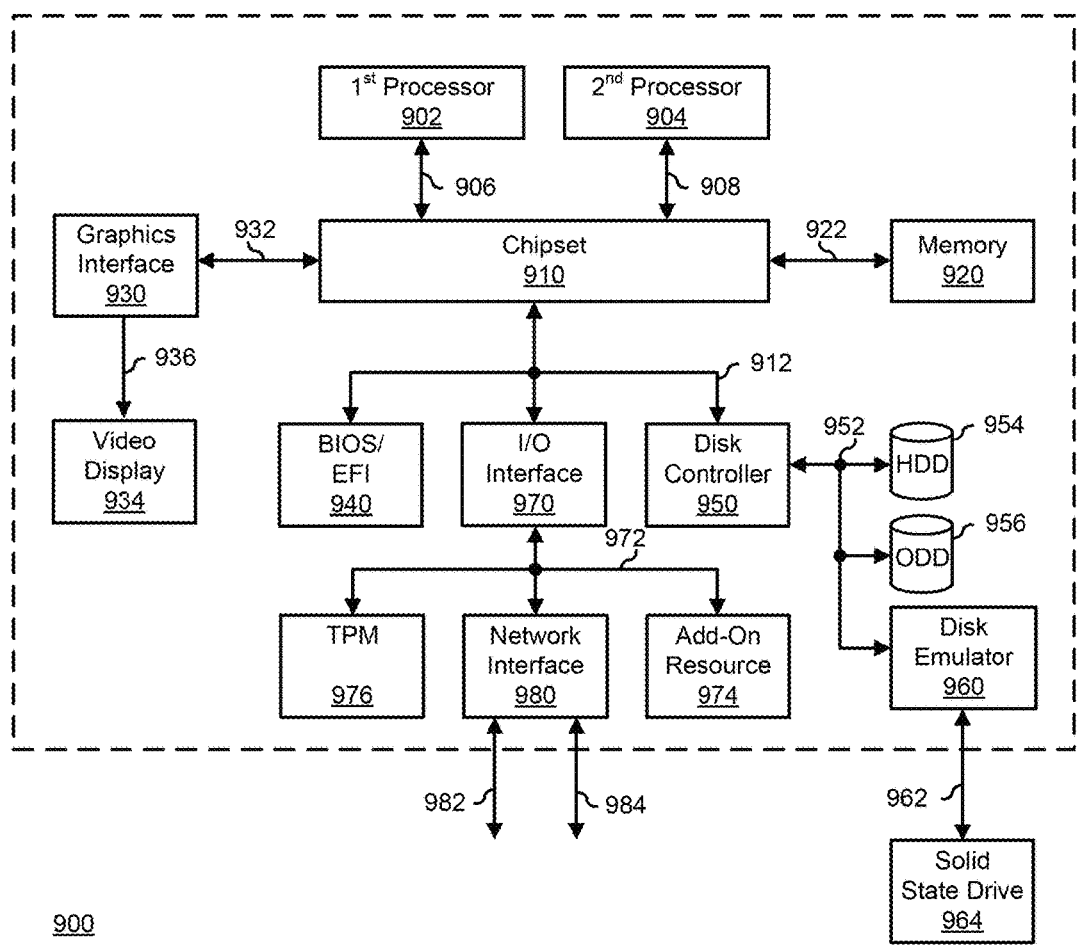
FIG. 9 is a block diagram illustrating a generalized information handling system according to an embodiment of the present disclosure.

FIG. 9 illustrates a generalized embodiment of information handling system 900. For purpose of this disclosure information handling system 900 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 900 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 900 can include processing resources for executing machine-executable code, such as a central processing unit (CPU), a programmable logic array (PLA), an embedded device such as a System-on-a-Chip (SoC), or other control logic hardware. Information handling system 900 can also include one or more computer-readable medium for storing machine-executable code, such as software or data. Additional components of information handling system 900 can include one or more storage devices that can store machine-executable code, one or more communications ports for communicating with external devices, and various input and output (I/O) devices, such as a keyboard, a mouse, and a video display. Information handling system 900 can also include one or more buses operable to transmit information between the various hardware components.

Information handling system 900 can include devices or modules that embody one or more of the devices or modules described above, and operates to perform one or more of the methods described above. Information handling system 900 includes a processors 902 and 904, a chipset 910, a memory 920, a graphics interface 930, include a basic input and output system/extensible firmware interface (BIOS/EFI) module 940, a disk controller 950, a disk emulator 960, an input/output (I/O) interface 970, and a network interface 980. Processor 902 is connected to chipset 910 via processor interface 906, and processor 904 is connected to the chipset via processor interface 908. Memory 920 is connected to chipset 910 via a memory bus 922. Graphics interface 930 is connected to chipset 910 via a graphics interface 932, and provides a video display output 936 to a video display 934. In a particular embodiment, information handling system 900 includes separate memories that are dedicated to each of processors 902 and 904 via separate memory interfaces. An example of memory 920 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 940, disk controller 950, and I/O interface 970 are connected to chipset 910 via an I/O channel 912. An example of I/O channel 912 includes a Peripheral Component Interconnect (PCI) interface, a PCI-Extended (PCI-X) interface, a high speed PCI-Express (PCIe) interface, another industry standard or proprietary communication interface, or a combination thereof. Chipset 910 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 940 includes BIOS/EFI code operable to detect resources within information handling system 900, to provide drivers for the resources, initialize the resources, and access the resources. BIOS/EFI module 940 includes code that operates to detect resources within information handling system 900, to provide drivers for the resources, to initialize the resources, and to access the resources.

Disk controller 950 includes a disk interface 952 that connects the disc controller to a hard disk drive (HDD) 954, to an optical disk drive (ODD) 956, and to disk emulator 960. An example of disk interface 952 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 960 permits a solid-state drive 964 to be connected to information handling system 900 via an external interface 962. An example of external interface 962 includes a USB interface, an IEEE 1394 (Firewire) interface, a proprietary interface, or a combination thereof. Alternatively, solid-state drive 964 can be disposed within information handling system 900.

I/O interface 970 includes a peripheral interface 972 that connects the I/O interface to an add-on resource 974, to a TPM 976, and to network interface 980. Peripheral interface 972 can be the same type of interface as I/O channel 912, or can be a different type of interface. As such, I/O interface 970 extends the capacity of I/O channel 912 when peripheral interface 972 and the I/O channel are of the same type, and the I/O interface translates information from a format suitable to the I/O channel to a format suitable to the peripheral channel 972 when they are of a different type. Add-on resource 974 can include a data storage system, an additional graphics interface, a network interface card (NIC), a sound/video processing card, another add-on resource, or a combination thereof. Add-on resource 974 can be on a main circuit board, on separate circuit board or add-in card disposed within information handling system 900, a device that is external to the information handling system, or a combination thereof.

Network interface 980 represents a NIC disposed within information handling system 900, on a main circuit board of the information handling system, integrated onto another component such as chipset 910, in another suitable location, or a combination thereof. Network interface device 980 includes network channels 982 and 984 that provide interfaces to devices that are external to information handling system 900. In a particular embodiment, network channels 982 and 984 are of a different type than peripheral channel 972 and network interface 980 translates information from a format suitable to the peripheral channel to a format suitable to external devices. An example of network channels 982 and 984 includes InfiniBand channels, Fibre Channel channels, Gigabit Ethernet channels, proprietary channel architectures, or a combination thereof. Network channels 982 and 984 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A serial data system, comprising:
   a transmitter to encode a serial data stream using a quaternary pulse amplitude modulation (PAM-4) scheme into a stream of 2-bit symbols, wherein a particular symbol is represented as a signal at one of four signal levels, and wherein the four signal levels include two balanced pairs of differential signal levels; and
   a hardware de-emphasis circuit to:
      determine that a first symbol of the encoded serial data stream is represented as a first instance of a first state of the PAM-4 scheme;
      determine that a second symbol of the encoded data stream is represented as a second instance of the first state;
      determine that a third symbol of the encoded serial data stream is represented as a second state of the PAM-4 scheme;
      determine that the second state is of a same balanced pair as the first state;
      provide a de-emphasis to a voltage level of the second symbol in response to determining that the second state is of the same balanced pair as the first state;
      determine that the second state is of a different balanced pair from the first state; and
      provide the de-emphasis and a correction factor to the voltage level of the second symbol in response to determining that the second state is of the different balanced pair from the first state.

2. The serial data system of claim 1, wherein the hardware de-emphasis circuit comprises a two-tap feed forward equalization (FFE) circuit.

3. The serial data system of claim 2, wherein the two-tap FFE circuit comprises a first order compensation level ($C_0$) and a second order compensation level ($C_1$), and wherein the compensation levels are related such that $C_0 - C_1 = 1$.

4. The serial data system of claim 3, wherein:
   a first balanced pair comprises signal levels of a and −a, and a second balanced pair comprises signal levels of a/3 and −a/3;
   the correction factor corrects for an error factor induced by the two-tap FFE circuit when the second state is of the different balanced pair from the first state; and
   the error factor is equal to one of $\pm C_1 \times (2a/3)$ and $\pm C_1 \times (4a/3)$.

5. The serial data system of claim 4, wherein the correction factor is selected to offset the error factor such that the correction factor is equal to one of $\pm C_1 \times (2a/3)$ and $\pm C_1 \times (4a/3)$.

6. The serial data system of claim 4, wherein the correction factor is selected to partially offset the error factor.

7. The serial data system of claim 1, wherein the de-emphasis is provided in one of twenty de-emphasis levels, each de-emphasis level prescribing a different amount of de-emphasis.

8. The serial data system of claim 7, wherein the different amounts of de-emphasis comprise de-emphasis levels 0.5 dB to 10 dB, in 0.5 dB steps.

9. A method, comprising:
encoding, by a transmitter of a serial data channel, a serial data stream using a quaternary pulse amplitude modulation (PAM-4) scheme into a stream of 2-bit symbols, wherein a particular symbol is represented as a signal at one of four signal levels, and wherein the four signal levels include two balanced pairs of differential signal levels;
determining, by a hardware de-emphasis circuit of the serial data channel, that a first symbol of the encoded serial data stream is represented as a first instance of a first state of the PAM-4 scheme;
determining, by the hardware de-emphasis circuit, that a second symbol of the encoded data stream is represented as a second instance of the first state;
determining, by the hardware de-emphasis circuit, that a third symbol of the encoded serial data stream is represented as a second state of the PAM-4 scheme;
determining, by the hardware de-emphasis circuit, that the second state is of a same balanced pair as the first state;
providing, by the hardware de-emphasis circuit, a de-emphasis to a voltage level of the second symbol in response to determining that the second state is of the same balanced pair as the first state;
determining, by the hardware de-emphasis circuit, that the second state is of a different balanced pair from the first state; and
providing, by the hardware de-emphasis circuit, the de-emphasis and a correction factor to the voltage level of the second symbol in response to determining that the second state is of the different balanced pair from the first state.

10. The method of claim 9, wherein the hardware de-emphasis circuit comprises a two-tap feed forward equalization (FFE) circuit.

11. The method of claim 10, wherein the two-tap FFE circuit comprises a first order compensation level ($C_0$) and a second order compensation level ($C_1$), and wherein the compensation levels are related such that $C_0-C_1=1$.

12. The method of claim 11, wherein:
a first balanced pair comprises signal levels of a and −a, and a second balanced pair comprises signal levels of a/3 and −a/3;
the correction factor corrects for an error factor induced by the two-tap FFE circuit when the second state is of the different balanced pair from the first state; and
the error factor is equal to one of $\pm C_1 \times (2a/3)$ and $\pm C_1 \times (4a/3)$.

13. The method of claim 12, wherein the correction factor is selected to offset the error factor such that the correction factor is equal to one of $\pm C_1 \times (2a/3)$ and $\pm C_1 \times (4a/3)$.

14. The method of claim 12, wherein the correction factor is selected to partially offset the error factor.

15. The method of claim 9, wherein the de-emphasis is provided in one of twenty de-emphasis levels, each de-emphasis level prescribing a different amount of de-emphasis.

16. The method of claim 15, wherein the different amounts of de-emphasis comprise de-emphasis levels 0.5 dB to 10 dB, in 0.5 dB steps.

17. A serial data system, comprising:
a transmitter to encode a serial data stream using a quaternary pulse amplitude modulation (PAM-4) scheme into a stream of 2-bit symbols, wherein a particular symbol is represented as a signal at one of four signal levels, and wherein the four signal levels include two balanced pairs of differential signal levels; and
a hardware de-emphasis circuit to:
determine that a first symbol of the encoded serial data stream is represented as a first instance of a first state of the PAM-4 scheme;
determine that a second symbol of the encoded data stream is represented as a second instance of the first state;
determine that a third symbol of the encoded serial data stream is represented as a second state of the PAM-4 scheme;
determine that the second state is of a same balanced pair as the first state;
provide a de-emphasis to a voltage level of the second symbol in response to determining that the second state is of the same balanced pair as the first state;
determine that the second state is of a different balanced pair from the first state; and
provide the de-emphasis and a correction factor to the voltage level of the second symbol in response to determining that the second state is of the different balanced pair from the first state;
wherein the hardware de-emphasis circuit comprises a two-tap feed forward equalization (FFE) circuit, and wherein the de-emphasis is provided in one of twenty de-emphasis levels, each de-emphasis level prescribing a different amount of de-emphasis.

18. The serial data system of claim 17, wherein the two-tap FFE circuit comprises a first order compensation level ($C_0$) and a second order compensation level ($C_1$), and wherein the compensation levels are related such that $C_0-C_1=1$.

19. The serial data system of claim 18, wherein:
a first balanced pair comprises signal levels of a and −a, and a second balanced pair comprises signal levels of a/3 and −a/3;
the correction factor corrects for an error factor induced by the two-tap FFE circuit when the second state is of the different balanced pair from the first state; and
the error factor is equal to one of $\pm C_1 \times (2a/3)$ and $\pm C_1 \times (4a/3)$.

20. The serial data system of claim 19, wherein the correction factor is selected to offset the error factor such that the correction factor is equal to one of $\pm C_1 \times (2a/3)$ and $\pm C_1 \times (4a/3)$.

* * * * *